(12) United States Patent
Kang et al.

(10) Patent No.: US 11,551,823 B2
(45) Date of Patent: Jan. 10, 2023

(54) RADIOACTIVE MATERIAL REDUCTION FACILITY AND NUCLEAR POWER PLANT HAVING THE SAME

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Kyungjun Kang, Iksan-si (KR); Jihan Chun, Daejeon (KR); Hanok Kang, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 268 days.

(21) Appl. No.: 16/762,325

(22) PCT Filed: Oct. 24, 2018

(86) PCT No.: PCT/KR2018/012637
§ 371 (c)(1),
(2) Date: May 7, 2020

(87) PCT Pub. No.: WO2019/093693
PCT Pub. Date: May 16, 2019

(65) Prior Publication Data
US 2020/0273589 A1    Aug. 27, 2020

(30) Foreign Application Priority Data

Nov. 13, 2017 (KR) .......................... 10-2017-0150719

(51) Int. Cl.
*G21C 15/18* (2006.01)
*G21C 9/012* (2006.01)

(52) U.S. Cl.
CPC ............. *G21C 15/18* (2013.01); *G21C 9/012* (2013.01)

(58) Field of Classification Search
USPC ........................................ 376/203, 282, 283
See application file for complete search history.

(56) References Cited

U.S. PATENT DOCUMENTS 4,753,771 A * 6/1988 Conway ................. G21C 15/18
376/293
5,169,595 A * 12/1992 Cooke .................... G21C 15/18
376/282

(Continued)

FOREIGN PATENT DOCUMENTS

JP   H0283495 A   *  3/1990
JP   H06-342093 A    12/1994

(Continued)

OTHER PUBLICATIONS

International Search Report dated Mar. 11, 2019 issued in PCT/KR2018/012637.

*Primary Examiner* — Jack W Keith
*Assistant Examiner* — Jinney Kil
(74) *Attorney, Agent, or Firm* — Scully Scott Murphy and Presser

(57) ABSTRACT

The present disclosure relates to a radioactive material reduction facility, including a containment, a boundary section provided inside the compartment to partition an inner space of the containment into a first space for accommodating a reactor coolant system and a second space formed between the first space and the containment, and surround the reactor coolant system to prevent radioactive material discharged from the reactor coolant system or a line (Continued)

connected to the reactor coolant system inside the first space from being directly discharged into the second space during an accident, an in-containment refueling water storage tank (IRWST) installed between the first space and the second space and formed to accommodate refueling water, and a first discharge line formed to guide the flow of steam and radioactive material formed in the first space inside the boundary section into the in-containment refueling water storage tank.

Specifically, the radioactive material reduction facility according to the present disclosure may include a plurality of pools separated from each other, and the plurality of pools may include at least a first pool and a second pool, and the steam and the radioactive material may be discharged to the second pool through the first pool during an accident.

19 Claims, 3 Drawing Sheets

(56) References Cited

U.S. PATENT DOCUMENTS

| | | | | |
|---|---|---|---|---|
| 5,272,737 A * | 12/1993 | Fujii | | G21C 15/18 376/293 |
| 5,896,431 A * | 4/1999 | Cheung | | G21C 15/18 376/282 |
| 6,069,930 A * | 5/2000 | Gamble | | G21C 15/18 376/282 |
| 6,243,432 B1 * | 6/2001 | Cheung | | G21C 9/004 376/293 |
| 6,317,477 B1 * | 11/2001 | Matteson | | F16J 15/46 277/645 |
| 6,351,510 B1 * | 2/2002 | Bredolt | | G21C 13/00 376/205 |
| 2012/0155597 A1 * | 6/2012 | Cook | | G21C 9/004 376/283 |
| 2013/0259184 A1 * | 10/2013 | Sato | | G21C 13/00 376/293 |
| 2015/0221403 A1 * | 8/2015 | Kim | | G21D 3/04 376/294 |
| 2016/0141054 A1 | 5/2016 | No et al. | | |

FOREIGN PATENT DOCUMENTS

| | | |
|---|---|---|
| JP | 2012-117821 A | 6/2012 |
| KR | 10-1538932 B1 | 7/2015 |
| KR | 10-1601743 B1 | 3/2016 |
| KR | 101601743 B1 * | 3/2016 |

* cited by examiner

RADIOACTIVE MATERIAL REDUCTION FACILITY AND NUCLEAR POWER PLANT HAVING THE SAME

CROSS-REFERENCE TO RELATED APPLICATION

Pursuant to 35 U.S.C. § 119(a), this application claims the benefit of the earlier filing date and the right of priority to Korean Patent Applications No. 10-2017-0150719, filed on Nov. 13, 2017, the contents of which are incorporated by reference herein in their entirety.

TECHNICAL FIELD

The present disclosure relates to a safety system for securing the safety of a nuclear power plant, and more particularly, to a facility capable of reducing a pressure inside a containment and a concentration of radioactive material by a passive principle when a nuclear accident occurs.

BACKGROUND ART

Nuclear reactors are divided into loop type reactors (e.g., commercial reactors: Korea) in which major components (steam generator, pressurizer, pump, etc.) are installed outside a reactor vessel and integral reactors (e.g., SMART reactors: Korea) in which the major components are installed inside a reactor vessel.

In addition, reactors are divided into active reactors and passive reactors depending on the implementation method of a safety system. An active reactor is a reactor using an active component such as a pump operated by electric power of an emergency generator or the like to drive a safety system, and a passive reactor is a reactor using a passive component operated by gravity, gas pressure or the like to drive a safety system. A passive safety system in a passive reactor may maintain the reactor in a safe manner only with a natural force built in the system without an operator action or an AC power source of safety grade such as an emergency diesel generator for more than a period of time (72 hours) required by regulatory requirements in the event of an accident, and the safety system may receive assistance from an operator action or a non-safety system after 72 hours.

A containment (containment building, reactor building, containment vessel, safeguard vessel, or the like) serving as a final barrier to prevent leakage of radioactive material from a reactor to an external environment may be divided into a containment building (or referred to as a reactor building) formed of reinforced concrete, a containment vessel and a safeguard vessel formed with a steel vessel depending on a material constituting a pressure boundary thereof. The containment vessel is a large vessel designed at low pressure such as the containment building, and the safeguard vessel is a small vessel designed to be small by increasing the design pressure. Unless otherwise specified, the containment building, the reactor building, the containment vessel or the safeguard vessel are collectively referred to as a containment.

For a method of reducing the pressure and temperature inside the containment and reducing the concentration of radioactive material, active and passive systems are used in various forms such as a containment spray system, a containment cooling system, a suppression tank or a suppression sump. Hereinafter, these facilities will be sequentially described below.

The active containment spray system (Korea commercial reactor, SMART reactor, etc.) method performs a function of spraying a large amount of cooling water using a pump during an accident, collecting cooling water into an in-containment refueling water tank, a sump or the like, and respraying the cooling water to reduce the pressure, temperature and concentration of radioactive material in the containment for a long period of time. The active containment spray system may perform a long-term spray function, but has a characteristic in which a power system for driving the pump must be available.

The passive containment spray system (CANDU, Canada, etc.) method has a cooling water storage tank at an upper section of the containment, and performs a function of spraying a large amount of cooling water during an accident to reduce the pressure, temperature and the concentration of radioactive material inside the containment. The passive containment spray system has a characteristic in which the system cannot be operated for more than a predetermined period of time due to the limitation of the storage capacity of the cooling water. Therefore, in order to use the passive containment spray system for a long period of time, the cooling water storage tank should be replenished periodically using a pump. This means that a pump and a power system for driving the pump must be available for a long-term operation of the passive containment spray system.

The suppression tank (commercial BWR, CAREM: Argentina, IRIS: U.S. Westinghouse Corporation, etc.) method performs a function of introducing steam discharged into the containment to the suppression tank using a pressure difference inside the containment and the suppression tank, and condensing the steam to reduce the pressure, temperature and the concentration of the radioactive material inside the containment. The suppression tank method has a characteristic of operating only until the pressure inside the containment is higher than the pressure inside the suppression tank.

The passive containment cooling system method performs a function of installing a heat exchanger and a cooling water tank inside or outside the containment, and condensing steam inside the containment using the heat exchanger to reduce the pressure, temperature and the concentration of the radioactive material inside the containment. The passive containment cooling system method uses natural circulation inside the containment, and thus has a characteristic in which a reduction capacity of the pressure, temperature and radioactive material are relatively reduced as compared with the active spray system.

In addition, as a part of the passive containment there is a method in which a steel containment vessel is applied, an outer wall is cooled (spray, air), steam inside the containment vessel is condensed on an inner wall of the containment vessel to perform a function of reducing the pressure, temperature and the concentration of radioactive material (AP1000: Westinghouse Inc., USA), and the like. Similarly to the passive containment cooling system method, this method uses natural circulation inside the containment, and thus has a characteristic in which a reduction capacity of the pressure, temperature and radioactive material are relatively reduced as compared with the active spray system.

Particularly, for a cooling water storage method, a refueling water tank may be installed in the containment vessel to use refueling water in the in-containment refueling water storage tank (IRWST) as a coolant water supply source. The in-containment refueling water storage tank (IRWST) may perform the role of storing refueling water, providing safe injection and a cooling water source of the containment vessel spray system, and providing a heat sink for condensing the condensation of steam discharged from the pressurizer.

In detail, cooling water required for the refueling water tank may be supplied by a unique function of the in-containment refueling water storage tank (IRWST) in the storage tank during refueling. In addition, the in-containment refueling water storage tank (IRWST) may accommodate materials discharged during a nuclear accident to prevent contamination inside the containment.

Most of the systems described above have excellent performance in reducing the pressure and temperature inside the containment. However, the system described above has a limitation in reducing radioactive material, iodine, which can diffuse to the external environment during a nuclear accident.

Iodine generated during a nuclear accident may dissolve in most cases when in contact with water (solubility 0.029 g/100 g (20° C.)). Therefore, the most excellent performance for reducing the concentration of radioactive material inside the containment among these safety systems related to the containment is provided by an active containment spray system (a method employed by Korea commercial reactors) which sprays a large amount of cooling water using an active pump and recirculates the cooling water for a long period of time. However, the active safety system has a problem in which emergency AC power must be supplied in order to operate an active device such as a pump during a nuclear accident, and the active safety system does not operate when the emergency AC power is not supplied.

From this point of view, there is a growing demand for a passive safety system in which the safety system operates without supplying emergency AC power. When the passive safety system is applied to a nuclear power plant during a nuclear accident, the safety of the nuclear power plant may be significantly increased compared to the case of applying the active safety system.

However, when the passive safety system method is employed as a safety system of the containment, the performance of cooling the containment is insufficient as compared to the active safety system method, and thus the concentration of radioactive material inside the containment may be relatively high. Accordingly, when the passive safety system method is employed as a safety system for the containment, an exclusion area boundary (EAB) or a low population zone (LPL), which restricts the residence of the public for the safety of the general public during an accident by assuming a nuclear accident, will be set to a nuclear power plant.

In particular, in setting the exclusion area boundary (EAB), it is common to set a larger restricted area boundary (EAB) compared to that of the active safety system. The expansion of the restricted area boundary (EAB) may result in a problem that greatly increases the construction cost of a nuclear power plant.

Accordingly, the present disclosure presents a radioactive material reduction facility of effectively collecting radioactive material and being effectively used as a heat sink in the in-containment refueling water storage tank (IRWST) to prevent the pressure of the nuclear reactor and the concentration of radioactive material from being increased during a nuclear accident, and a nuclear power plant having the same.

DISCLOSURE OF INVENTION

Technical Problem

An object of the present disclosure is to propose a radioactive material reduction facility which contributes to the safety improvement of a nuclear power plant capable of reducing the concentration of radioactive material discharged during an accident of leaking reactor coolant from the nuclear power plant.

Another object of the present disclosure is to propose a radioactive material reduction facility for providing a heat sink for condensation of steam containing radioactive material according to an accident progression during an accident of leaking reactor coolant from the nuclear power plant.

Still another object of the present disclosure is to propose a radioactive material reduction facility capable of solving a problem of expanding an exclusion area boundary of a nuclear power plant, and the nuclear power plant having the same.

Solution to Problem

The present disclosure relates to a radioactive material reduction facility, including a containment, a boundary section provided inside the compartment to partition an inner space of the containment into a first space for accommodating a reactor coolant system and a second space formed between the first space and the containment, and surround the reactor coolant system to prevent radioactive material discharged from the reactor coolant system or a line connected to the reactor coolant system inside the first space from being directly discharged into the second space during an accident, an in-containment refueling water storage tank (IRWST) installed between the first space and the second space and formed to accommodate refueling water, and a first discharge line formed to guide the flow of steam and radioactive material formed in the first space inside the boundary section into the in-containment refueling water storage tank.

Specifically, in the radioactive material reduction facility according to the present disclosure, the in-containment refueling water storage tank may include a plurality of pools separated from each other, and the plurality of pools may include at least a first pool and a second pool, and the steam and the radioactive material may be discharged to the second pool through the first pool during an accident.

According to an embodiment, the boundary section may include a partition wall formed to surround the reactor coolant system, and a cover formed to cover an upper section of the reactor coolant system.

According to an embodiment, the radioactive material reduction facility may include a refueling cavity formed to surround the cover at the boundary section.

According to an embodiment, the upper section of the reactor coolant system and the cover may be formed to be detachable.

According to an embodiment, the radioactive material reduction facility may further include a sealing device formed to be open and closed between the partition wall and the reactor coolant system.

According to an embodiment, the radioactive material reduction facility may further include a connection line formed between the in-containment refueling water storage tank and the reactor coolant system to flow refueling water.

According to an embodiment, refueling water may be supplied based on a driving force of a pump for the injection of the connection line.

According to an embodiment, the radioactive material reduction facility may further include a discharge section provided at an upper section of the in-containment refueling water storage tank to prevent an overpressure of the in-containment refueling water storage tank and discharge non-condensable gas or steam into the second space.

According to an embodiment, the capacity of the first pool may be larger than that of the second pool, and the capacity of the second pool may be 1/20 to 1/10 of the capacity of the first pool.

According to an embodiment, the radioactive material reduction facility may include a second discharge line formed between the first pool and the second pool to flow steam and radioactive material.

According to an embodiment, the second discharge line may be formed to discharge steam and radioactive material at a pressure lower than the pressure at which the steam and the radioactive material are discharged from the first discharge line.

According to an embodiment, the first discharge line may further include a check valve formed to move steam and radioactive material formed in the first space to the in-containment refueling water storage tank.

According to an embodiment, refueling water in the second pool may be maintained at a pH of a preset value or more to prevent the volatilization of radioactive material during a normal operation and during an accident.

According to an embodiment, a pH of the refueling water of the second pool may be higher than that of the refueling water of the first pool during an accident.

According to an embodiment, the second pool may further include an additive injection facility for injecting an additive into the second pool to allow a pH value of the refueling water to be maintained above the preset value.

According to an embodiment, the additive injection facility may be formed not to inject an additive during a normal operation and formed to inject the additive during an accident.

Furthermore, the present disclosure relates to a nuclear power plant, including a containment, a boundary section provided inside the compartment to partition an inner space of the containment into a first space for accommodating a reactor coolant system and a second space formed between the first space and the containment, and surround the reactor coolant system to prevent radioactive material discharged from the reactor coolant system or a line connected to the reactor coolant system inside the first space from being directly discharged into the second space during an accident, an in-containment refueling water storage tank (IRWST) installed between the first space and the second space and formed to accommodate refueling water, and a first discharge line formed to guide the flow of steam and radioactive material formed in the first space inside the boundary section into the in-containment refueling water storage tank.

Specifically, in the nuclear power plant according to the present disclosure, the in-containment refueling water storage tank may include a plurality of pools separated from each other, and the plurality of pools may include at least a first pool and a second pool, and the steam and the radioactive material may be discharged to the second pool through the first pool during an accident.

Advantageous Effects of Invention

When a reactor coolant leaking accident occurs, the radioactive material reduction facility according to the present disclosure may jet radioactive material and steam contained in the atmosphere (air and steam) in a first space to the refueling water of the in-containment refueling water storage tank (IRWST) for collection, and condensing the radioactive material in a second pool to reduce the concentration of the radioactive material inside the containment, thereby improving the safety of the nuclear power plant.

Furthermore, when an accident of leaking reactor coolant occurs, the radioactive material reduction facility according to the present disclosure may operate effectively to a heat sink through a plurality of pools connected to each other to discharge non-condensable gas, steam and radioactive material to an inside of the containment through a discharge section of the in-containment refueling water storage tank (IRWST), thereby preventing the pressure of a second space from rapidly increasing.

In addition, when an accident of leaking reactor coolant occurs, the radioactive material reduction facility according to the present disclosure may effectively collect radioactive material to solve a problem of expanding the exclusion area boundary so as to improve the safety of the nuclear power plant, thereby reducing the nuclear construction cost.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1A:
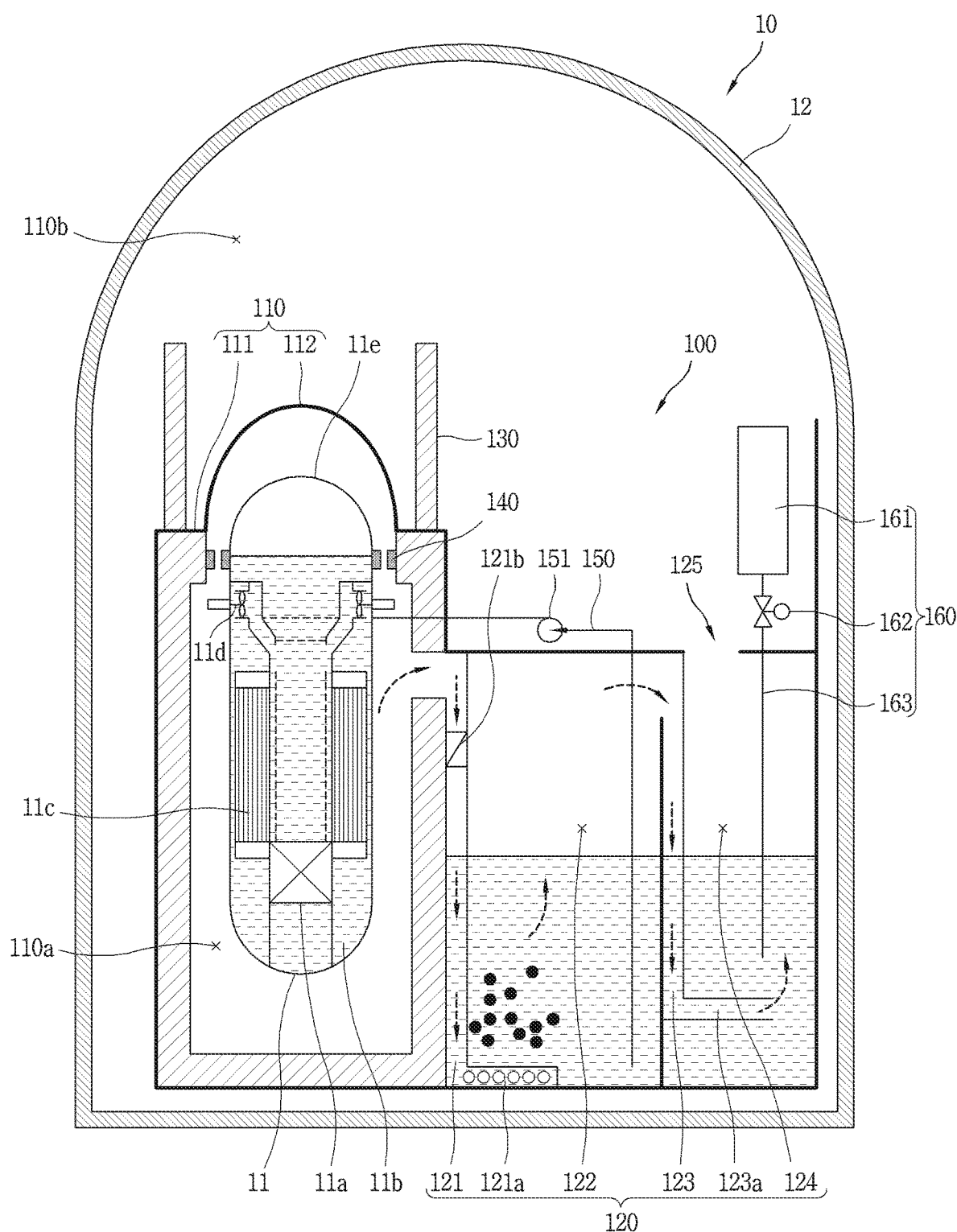
FIG. 1A is a conceptual view of a radioactive material reduction facility associated with an embodiment of the present disclosure, and a nuclear power plant having the same.

Hereinafter, preferred embodiments of the present disclosure will be described in detail with reference to the accompanying drawings, and the same or similar elements are designated with the same numeral references regardless of the numerals in the drawings and their redundant description will be omitted.

In describing the embodiments disclosed herein, moreover, the detailed description will be omitted when specific description for publicly known technologies to which the invention pertains is judged to obscure the gist of the present invention. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that although the terms first, second, etc. may be used herein to describe various elements, these elements should not be limited by these terms. The terms are used merely for the purpose to distinguish an element from the other element.

Incidentally, unless clearly used otherwise, expressions in the singular number include a plural meaning.

Terms "include" or "has" used herein should be understood that they are intended to indicate an existence of several components or several steps, disclosed in the specification, and it may also be understood that part of the components or steps may not be included or additional components or steps may further be included.

FIG. 1A is a conceptual view of a radioactive material reduction facility 100 associated with an embodiment of the present disclosure, and a nuclear power plant 10 having the same.

The containment 12 is installed at an outside of the reactor coolant system 11 to prevent the leakage of the radioactive material. In the present disclosure, the containment 12 collectively refers to a containment building, a reactor building, a containment vessel, a safeguard vessel, and the like in the nuclear power plant 10.

The boundary section 110 is provided inside the containment 12 to partition the containment 12 into a first space 110a for accommodating a reactor coolant system 11 and a second space 110b formed between the first space 110a and the containment 12. Furthermore, the boundary section 110 surrounds the reactor coolant system 11 to prevent radioactive material from being leaked from a connecting line (not shown) installed in the first space 110a into the second space 110b.

The atmosphere in the first space 110a inside the boundary section 110 includes air existing in the first space 110a during a normal operation of the nuclear power plant. On the other hand, the atmosphere may include steam or radioactive material being discharged during a nuclear accident such as a steam line break accident or a loss-of-coolant accident.

The boundary section 110 surrounds the reactor coolant system 11 to prevent the radioactive material from being leaked through a path other than the connecting line (not shown) installed in the first space 110a, thereby forming a sealing structure. Therefore, the boundary section 110 may be closed at the time of an accident to maintain a sealing structure. The boundary section 110 is formed at a design pressure capable of withstanding a pressure of the steam of the vaporized coolant during an accident. At least a part of the boundary section 110 may be formed by a concrete structure inside the containment 12 and a coating member (not shown) provided on the concrete structure.

The boundary section 110 may include a partition wall 111 and a cover 112. The cover 112 is formed to cover an upper section of the reactor coolant system 11. A bottom surface (or double bottom surface) of the partition 111, the cover 112 and the containment 12 may form a sealing structure around the reactor coolant system 11.

In addition, a sealing device 140 formed to be open and closed between the partition wall 111 and the reactor coolant system 11. The sealing device 140 is open during a normal operation of the nuclear power plant to partition the first space 110a between the reactor coolant system 11 and the cover 112.

The upper section 11e of the reactor coolant system and the cover 112 are formed to be detached from the reactor coolant system 11 and the partition wall 111, respectively. On the other hand, during a normal operation of the nuclear power plant, the upper section 11e of the reactor coolant system and the cover 112 are attached to the reactor coolant system 11 and the partition wall 111, respectively, to maintain air-tightness.

On the other hand, during a normal operation of the nuclear power plant, a fission reaction occurs in the core 11a to generate heat. Heat generated from the core 11a may be transferred to coolant inside the reactor coolant system 11 to produce steam in the steam generator 11c. The steam generator 11c may be a pressurized water reactor.

Moreover, steam produced by the steam generator 11c may be steam that is phase-changed by receiving water from a feedwater system (not shown) through a main feedwater line (not shown) and an isolation valve (not shown) connected thereto. The steam produced by the steam generator 11c is supplied to a large turbine (not shown) and a large generator (not shown) to produce electric power while the fluid energy of the steam is converted into electric energy through mechanical energy.

However, although the pressurized water reactor is illustrated in the present disclosure, the technology of the present disclosure is not limited to the pressurized water reactor. In addition, a reactor coolant pump 11d may circulate coolant 11b that fills an inside of the reactor coolant system 11.

According to an embodiment, the refueling cavity 130 surrounds the cover 112 and is formed so as to protrude from the partition wall 111 to accommodate refueling water during the refueling operation. On the other hand, the sealing device 140 is formed to be closed during the refueling operation. During the refueling operation, the upper section 11e of the reactor coolant system and the cover 112 are separated from the reactor coolant system 11 and the partition 111, respectively. It will be described in detail in the following description of FIG. 1B.

The radioactive material reduction facility 100 is installed inside the containment 12 and includes an in-containment refueling water storage tank 120 formed to accommodate refueling water between the first space 110a and the second space 110b.

The in-containment refueling water storage tank 120 includes a first discharge line 121, a first pool 122, a second discharge line 123, a second pool 124, and a discharge section 125. The in-containment refueling water storage tank 120 is provided with a plurality of pools separated from each other to accommodate refueling water. The pool of the in-containment refueling water storage tank 120 includes at least a first pool 122 and a second pool 124.

During an accident, steam and radioactive material are introduced into the in-containment refueling water storage tank 120. The first discharge line 121 is formed to introduce the steam of the vaporized coolant and radioactive material contained therein from a reactor coolant system 11 installed inside the containment 12 or a line (not shown) connected to the reactor coolant system 11 to flow into the in-containment refueling water storage tank 120.

In detail, the steam of the vaporized coolant and the radioactive material contained therein are discharged due to a difference between an internal pressure of the boundary section 110 including the reactor coolant system 11 and a pressure of the in-containment refueling water storage tank 120. As a result, the steam of the vaporized coolant and the radioactive material contained therein discharged through the first discharge line 121 are introduced into the first pool 122 to reduce the pressure while absorbing the heat and reducing the volume through the refueling water accommodated in the first pool 122.

Then, the steam of the vaporized coolant and the radioactive material contained therein discharged through the refueling water contained in the first pool 122 form a flow due to the pressure difference. Accordingly, it may be possible to collect radioactive material and reduce the volume of the steam of the vaporized coolant when introduced into the second pool 124 in which refueling water is accommodated through the second discharging line 123 between the first pool 122 and the second pool 124.

In other words, the radioactive material and the steam pass through the first pool 122 and the second pool 124 connected to each other when an accident of leaking reactor coolant occurs, the radioactive material reduction facility 100 according to the present disclosure may effectively operates as a heat sink. Accordingly, it may be possible to prevent the pressure of the second space 110b from being drastically increased due to the non-condensable gas, the steam, and the radioactive material discharged during a nuclear accident.

According to an embodiment, in order to effectively reduce the pressure of the steam of the vaporized coolant flowing into the first pool 122 through the first discharge line 121, the refueling water accommodated in the first pool 122 and the steam of the vaporized coolant should be in contact therewith for more than a predetermined period of time. Therefore, an end of the first discharge line 121 is preferably installed at the bottom of the first pool 122, and the steam of the vaporized coolant and the radioactive material are jetted through the sparger 121a. The steam discharged through the sparger 121a is condensed in the refueling water of the first pool 122, and the water soluble radioactive material is dissolved and collected in the refueling water, and the non-condensable gas or part of the non-condensed steam rises while being cooled.

In particular, the refueling water of the first pool 122 may be formed to suppress the reactivity of the core 11a when fuel including boric acid is reloaded. As a result, the refueling water of the first pool 122 is maintained at a pH of 5 to 5.5.

In addition, the pressure of the boundary portion 110 may be reduced while most of the vaporized coolant during an accident is compressed through the refueling water accommodated in the first pool 122. The refueling water accommodated in the first pool 122 may have a height of above 6 m to bring the steam of the vaporized coolant into contact with the steam for more than a predetermined period of time. When the height of the refueling water accommodated in the first pool 122 is less than 6 m, it is difficult to sufficiently perform the role of the heat sink for effectively condensing the steam of the vaporized coolant discharged during an accident.

In addition, the first pool 122 may be formed to have a larger capacity than the second pool 124. Specifically, the capacity of the second pool 124 is preferably formed to be 1/20 to 1/10 of the capacity of the first pool 122. When the capacity of the second pool 124 is less than 1/20 of the capacity of the first pool 122, the radioactive material in the second pool 124, which will be described later, cannot be collected efficiently.

On the other hand, when the capacity of the second pool 124 is greater than 1/10 of the capacity of the first pool 122, the capacity of the refueling water accommodated in the first pool 122 is reduced, thereby resulting in difficulty in compressing the steam discharged during an accident. In other words, when the capacity of the second pool 124 is greater than 1/10 of the capacity of the first pool 122, the capacity of the refueling water accommodated in the first pool 122 is reduced, thereby resulting in difficulty in reducing the pressure of the steam discharged during an accident.

According to an embodiment, the first pool 122 may be filled with about 3,500 t of refueling water, and the second pool 124 may be filled with about 200 t of refueling water. Accordingly, as described above, it may be possible to sufficiently perform the role of the heat sink for efficiently condensing the steam discharged during an accident through the refueling water accommodated in the first pool 122, and the radioactive material that has not been sufficiently collected in the first pool 122 may be collected through the second pool 124.

Specifically, the second discharge line 123 is formed to discharge steam and radioactive material at a pressure lower than the pressure at which the steam and the radioactive substance are discharged from the first discharge line 121.

As a result, the steam and the radioactive material whose pressure has been reduced through the refueling water accommodated in the first pool 122 are discharged through the second discharge line 123 and the sparger 123a into the refueling water of the second pool 124.

Specifically, in order to allow steam and radioactive material to be discharged to the second discharge line 123 at a pressure lower than the pressure at which the steam and the radioactive substance are discharged from the first discharge line 121, the second discharge line 123 may be designed to have a smaller head than the first discharge line 121.

Furthermore, the first discharge line 121 may further include a check valve 121b formed to move the steam and the radioactive material formed in the first space 110a to the in-containment refueling water storage tank 120.

Accordingly, even when the pressure of the in-containment refueling water storage tank 120 increases due to superheated steam, it may be possible to prevent refueling water accommodated in the in-containment refueling water storage tank 120 from flowing backward to the first space 110a in which the reactor coolant system 11 is accommodated.

On the other hand, since the pressure in the first space 110a is not higher than the pressure in the first pool 122, the flow of air to the check valve 121b and the first discharge line 121 is not formed.

According to an embodiment, the radioactive material reduction facility 100 may be designed to collect water-soluble radioactive material in the refueling water of the second pool 124, thereby preventing the radioactive material from being leaked directly to the external environment. In other words, the radioactive material may be condensed in the second pool 124 to reduce the concentration of the radioactive material inside the containment 12, thereby improving the safety of the nuclear power plant 10.

The radioactive material discharged during a nuclear accident may include xenon (Xe), krypton (Kr), and iodine 131I. In particular, in the case of 131I, it discharges energy of 0.971 MeV including $\beta$-ray in the nucleus and decays to 131Xe. Therefore, compared with radioactive xenon (Xe) and krypton (Kr), 131I accumulates in a thyroid gland of a human body to cause diseases such as cancer, and is known to be a dangerous radioactive material during a nuclear accident.

Radioactive iodine generated during a nuclear accident may dissolve in most cases when in contact with water (solubility 0.029 g/100 g (20° C.)). However, the radioactive iodine dissolved in the cooling water exists in the form of an anion, and the amount of the radioactive iodine may be greatly increased when the pH of the cooling water in which the radioactive iodine is dissolved is low. This is because the amount of radioactive iodine converted into the volatile elementary iodine ($I_2$) in the cooling water of pH 7 or less is greatly increased. In other words, most of the radioactive iodine cannot be collected in the refueling water of pH of 5 to 5.5 accommodated in the first pool 122, and discharged to an upper section of the first pool 122 through the refueling water accommodated in the first pool 122.

Accordingly, the first pool 122 and the second pool 124 are formed to accommodate the refueling water having different pHs from each other, and the pH of the refueling water of the second pool 124 may be higher than that of the refueling water of the first pool 122. Moreover, the refueling water of the second pool 124 may be formed to accommodate the refueling water having a pH of a preset value or more so as to prevent the volatilization of the radioactive material (in particular, iodine). Specifically, the pH of the preset value may be pH 7, and preferably pH 8 to 9.

Meanwhile, the radioactive material reduction facility 100 may further include an additive injection facility 160. According to an embodiment, the additive is introduced into the second pool 124 during a nuclear accident, and the refueling water accommodated in the first pool 122 and the second pool 124 are formed to have different pHs. Specifically, when the refueling water accommodated in the second pool 124 is refueling water having a pH of 5 to 5.5 including boric acid, such as the refueling water accommodated in the first pool 122 described above, the additive injection facility 160 supplies an additive to the refueling water accommodated in the second pool 124 that maintains the pH of the refueling water accommodated in the second pool 124 at a preset value or more (generally, a pH of 7 or more) so as to prevent the volatilization of the radioactive material dissolved in the second pool 124.

According to an embodiment, the additive injection facility 160 is formed to accommodate the additive in the additive accommodation section 161. During a normal operation of the nuclear power plane, the additive does not flow into the second pool 124 while the valve 162 is closed. However, during a nuclear accident, the valve 162 is open to inject the additive to the refueling water accommodated in the second pool 124 through the connection line 163.

For the additive, trisodium phosphate ($Na_3PO_4$) may be used. Trisodium phosphate controls the pH of the cooling water to prevent corrosion inside the containment 12 and re-volatilization of the radionuclide. However, in the present disclosure, the type of the additive is not necessarily limited thereto.

Moreover, a filter or an adsorbent (not shown) may be provided in the discharge section 125 to capture the radioactive material to be discharged into the second space 110b together with the steam during a nuclear accident. The filter or adsorbent is made to allow steam or air to pass therethrough and to capture the radioactive material.

According to an embodiment, the filter may use a high efficiency particle filter (HEPA filter). A gaseous form of radioactive material contained in the steam or atmosphere is removed while passing through the filter. For example, when the radioactive material is iodine, the iodine is converted to iodic silver in combination with silver nitrate while passing through the filter and removed from the steam or atmosphere.

Furthermore, activated carbon may be used for the adsorbent. Activated carbon is used for an adsorbent because it has a large internal adhesion area due to its porous structure. Iodine organic compounds are converted into a quaternary ammonium salt form in combination with materials impregnated in activated carbon and adsorbed on activated carbon. In addition, a molecular form of iodine binds to activated carbon through chemical adsorption.

The filter and the adsorbent may be disposed together, or only one of the filter and the adsorbent may be disposed. However, the above-described filter and adsorbent are described only by way of example, and the types of the filter and the adsorbent in the present disclosure are not necessarily limited to those described above.

Figure 1B:
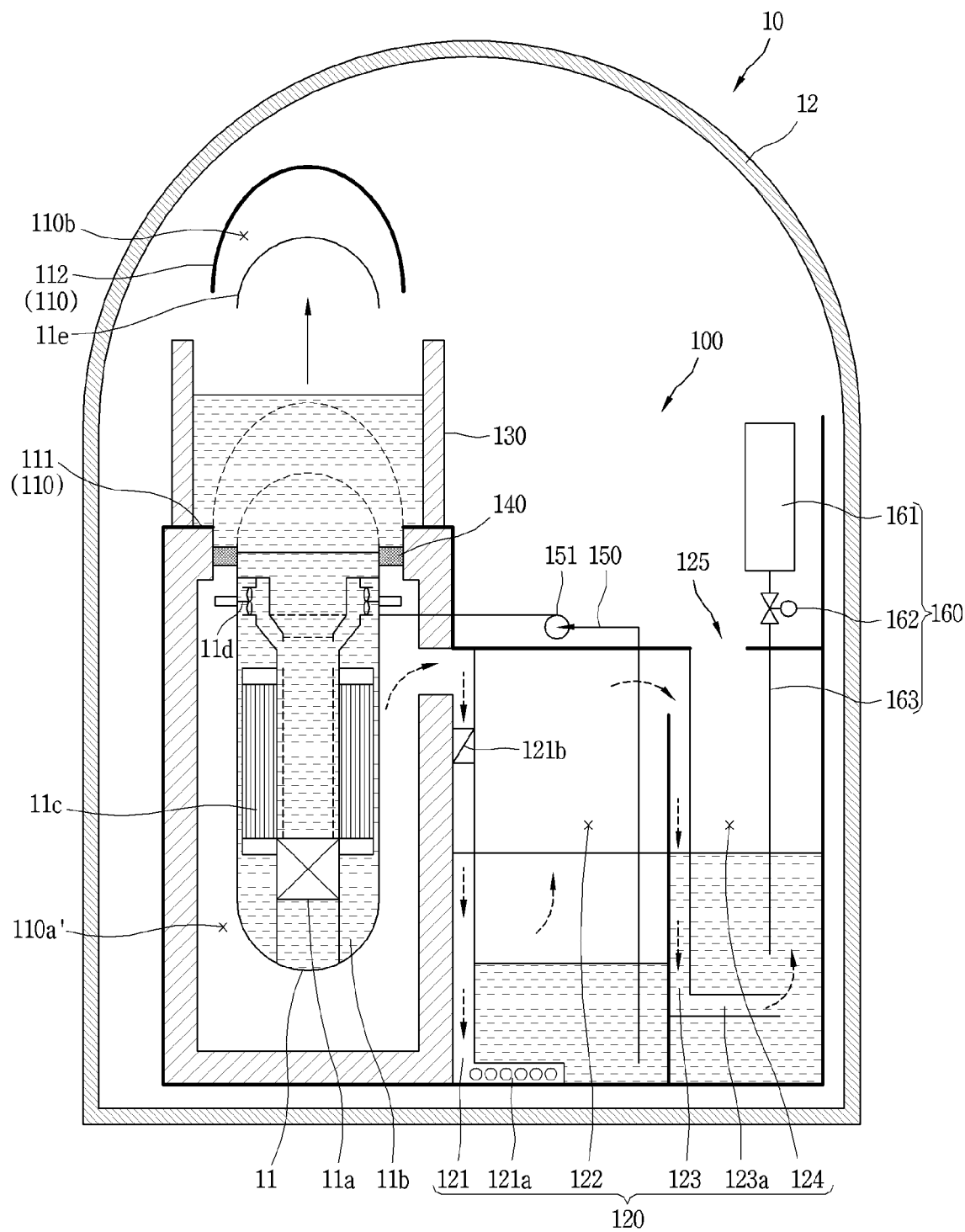
FIG. 1B is a conceptual view of a radioactive material reduction facility associated with an embodiment of the present disclosure, and a refueling operation of a nuclear power plant having the same.

FIG. 1B is a conceptual view of a radioactive material reduction facility 100 associated with an embodiment of the present disclosure, and a refueling operation of a nuclear power plant 10 having the same.

During the refueling operation of the nuclear power plant 10, the sealing device 140 may be closed when the refueling operation is carried out to partition the first space 110a' below the sealing device 140. Moreover, the upper section 11e of the reactor coolant system and the cover 112 are separated from the reactor coolant system 11 and the partition 111, respectively. In other words, a lower section of the refueling cavity 130 is closed by the sealing device 140.

During the refueling operation, refueling water is supplied to the reactor coolant system 11 through the connection line 150 formed to flow the refueling water between the in-containment refueling water storage tank 120 and the reactor coolant system 11. The refueling water supplied to the connection line 150 fills the reactor coolant system 11 and fills the refueling cavity 130.

In other words, the refueling water supplied to the reactor coolant system 11 is also supplied to and accommodated in the refueling cavity 130 to carry out the refueling operation safely. In detail, during the recharging operation, the injection of the refueling water through the connection line 150 is supplied based on a driving fore of the pump 151.

Furthermore, according to another embodiment electric power production section 230 described below, the same or similar reference numerals are designated to the same or similar configurations to the foregoing example, and the description thereof will be substituted by the earlier description.

Figure 2:
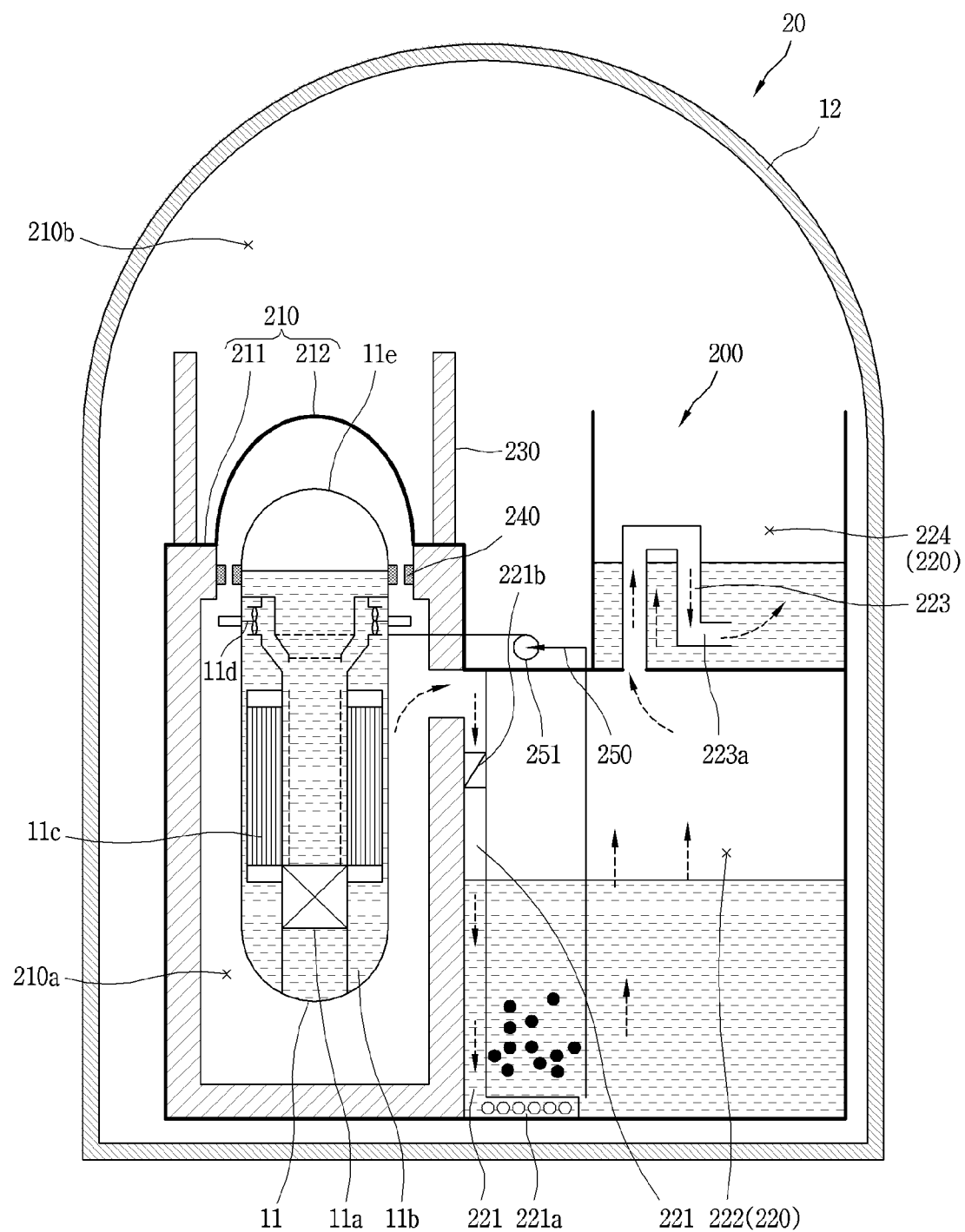
FIG. 2 is a conceptual view of a radioactive material reduction facility associated with another embodiment of the present disclosure, and a nuclear power plant having the same.

FIG. 2 is a conceptual view of a radioactive material reduction facility 200 associated with another embodiment of the present disclosure.

Referring to FIG. 2, the second pool 224 of the radioactive material reduction facility 200 may be disposed at an upper section of the first pool 222. As a result, during an accident, steam and radioactive material are introduced into the in-containment refueling water storage tank 220.

When an accident occurs, the first discharge line 221 allows the steam of coolant vaporized from the reactor coolant system 11 installed inside the containment 12 or a line (not shown) connected to the reactor coolant system 11 or the radioactive material contained therein to be introduced into the first pool 222 inside the containment while forming a flow due to a pressure difference to lose the heat and reduce the volume so as to reduce the pressure while passing through the refueling water accommodated in the first pool 222.

Then, the steam of the vaporized coolant and the radioactive material contained therein discharged through the refueling water contained in the first pool 222 form a flow due to the pressure difference. Accordingly, it may be possible to collect radioactive material and reduce the volume of the steam of the vaporized coolant when introduced into the second pool 224 in which refueling water is accommodated through the second discharging line 223 between the first pool 222 and the second pool 224.

According to an embodiment, the refueling water accommodated in the second pool 224 may be formed to accommodate the refueling water having a pH of a preset value or more so as to prevent the volatilization of the radioactive material (in particular, iodine). Specifically, the pH of the preset value may be pH 7, and preferably pH 8 to 9.

Moreover, the radioactive material reduction facility 200 may further include an additive injection facility (not shown). According to an embodiment, it may also be possible to have an embodiment in which the additive is introduced into the second pool 224 during a nuclear accident, and the refueling water accommodated in the first pool 222 and the second pool 224 are formed to have different pHs.

It is obvious to those skilled in the art that the present disclosure can be embodied in other specific forms without departing from the concept and essential characteristics thereof.

In addition, the detailed description thereof should not be construed as restrictive in all aspects but considered as illustrative. The scope of the invention should be determined by reasonable interpretation of the appended claims and all changes that come within the equivalent scope of the invention are included in the scope of the invention.

The invention claimed is:

1. A radioactive material reduction facility, comprising:
    a containment;
    a boundary section provided inside the containment to partition an inner space of the containment into a first space for accommodating a reactor coolant system and a second space formed between the first space and the containment;
    an in-containment refueling water storage tank installed inside the second space and outside the first space and formed to accommodate refueling water; and
    a first discharge line formed to guide a flow of steam and radioactive material formed in the first space inside the boundary section into the in-containment refueling water storage tank,
    wherein the in-containment refueling water storage tank comprises a plurality of pools separated from each other, and the plurality of pools comprises at least a first pool and a second pool, and
    the steam and the radioactive material are discharged to the second pool through the first pool during an accident, and
    the second pool is formed to accommodate the refueling water having a pH of a preset value or more so as to prevent the volatilization of the radioactive material, and
    wherein the first pool and the second pool are formed to accommodate the refueling water, the first pool and the second pool having a different pH from each other, and the pH of the refueling water of the second pool is higher than that of the refueling water of the first pool during an accident.

2. The radioactive material reduction facility of claim 1, wherein the boundary section comprises a partition wall formed to surround the reactor coolant system; and
    a cover formed to cover an upper section of the reactor coolant system.

3. The radioactive material reduction facility of claim 2, comprising:
    a refueling cavity formed to surround the cover at the boundary section.

4. The radioactive material reduction facility of claim 3, wherein the upper section of the reactor coolant system and the cover are formed to be detachable.

5. The radioactive material reduction facility of claim 3, further comprising:
    a sealing device formed to be opened and closed between the partition wall and the reactor coolant system.

6. The radioactive material reduction facility of claim 3, further comprising:
    a connection line formed between the in-containment refueling water storage tank and the reactor coolant system to flow refueling water.

7. The radioactive material reduction facility of claim 6, wherein refueling water is injected into the connection line by a driving force of a pump and supplied to the reactor coolant system through the connection line.

8. The radioactive material reduction facility of claim 1, further comprising: a discharge section provided at an upper section of the in-containment refueling water storage tank to prevent an overpressure of the in-containment refueling water storage tank and discharge non-condensable gas or steam into the second space.

9. The radioactive material reduction facility of claim 1, wherein the capacity of the first pool is larger than that of the second pool, and the capacity of the second pool is $1/20$ to $1/10$ of the capacity of the first pool.

10. The radioactive material reduction facility of claim 1, comprising:
    a second discharge line formed between the first pool and the second pool to flow steam and radioactive material.

11. The radioactive material reduction facility of claim 10, wherein the second discharge line is formed to discharge steam and radioactive material at a pressure lower than the pressure at which the steam and the radioactive material are discharged from the first discharge line.

12. The radioactive material reduction facility of claim 10, wherein the first discharge line further comprises a check valve formed to move steam and radioactive material formed in the first space to the in-containment refueling water storage tank.

13. The radioactive material reduction facility of claim 1, wherein refueling water in the second pool is maintained at a pH of a preset value or more to prevent the volatilization of radioactive material during a normal operation and during an accident.

14. The radioactive material reduction facility of claim 1, wherein the second pool further comprises an additive injection facility for injecting an additive into the second pool to allow a pH value of the refueling water to be maintained above the preset value.

15. The radioactive material reduction facility of claim 14, wherein the additive injection facility is formed not to inject an additive during a normal operation and formed to inject the additive during an accident.

16. A nuclear power plant, comprising a radioactive material reduction facility, said radioactive material reduction facility comprising:
    a containment;
    a boundary section provided inside the containment to partition an inner space of the containment into a first space for accommodating a reactor coolant system and a second space formed between the first space and the containment;
    an in-containment refueling water storage tank installed inside the second space and outside the first space and formed to accommodate refueling water; and
    a first discharge line formed to guide a flow of steam and radioactive material formed in the first space inside the boundary section into the in-containment refueling water storage tank,
    wherein the in-containment refueling water storage tank comprises a plurality of pools separated from each other, and the plurality of pools comprises at least a first pool and a second pool, and the steam and the radioactive material are discharged to the second pool through the first pool during an accident, and the second pool is formed to accommodate the refueling water having a pH of a preset value or more so as to prevent the volatilization of the radioactive material, and wherein the first pool and the second pool are formed to accommodate the refueling water, the first pool and the second pool having a different pH from each other, and the pH of the refueling water of the second pool is higher than that of the refueling water of the first pool during an accident.

17. The nuclear power plant of claim 16, wherein the boundary section comprises a partition wall formed to surround the reactor coolant system; and a cover formed to cover an upper section of the reactor coolant system.

18. The nuclear power plant of claim 17, wherein the radioactive material reduction facility further comprises:

a refueling cavity formed to surround the cover at the boundary section.

19. The nuclear power plant of claim 18, wherein the upper section of the reactor coolant system and the cover are formed to be detachable.

* * * * *